United States Patent [19]

Chromecek

[11] Patent Number: 4,870,145

[45] Date of Patent: Sep. 26, 1989

[54] PROCESS FOR PREPARING POLYMERIC BEADS

[75] Inventor: Richard C. Chromecek, Litchfield, Conn.

[73] Assignee: Bausch & Lomb Incorporated, Rochester, N.Y.

[21] Appl. No.: 93,058

[22] Filed: Sep. 2, 1987

Related U.S. Application Data

[63] Continuation of Ser. No. 703,786, Feb. 21, 1985, abandoned.

[51] Int. Cl.$^4$ .............................................. C08F 2/08
[52] U.S. Cl. .................................... 526/217; 526/264; 526/270; 526/317.1; 526/310
[58] Field of Search ................ 526/217, 89, 264, 270, 526/317.1, 310, 303.1

[56] References Cited

U.S. PATENT DOCUMENTS

| | | | |
|---|---|---|---|
| 3,218,302 | 11/1965 | Melamid | 526/303.1 |
| 3,232,912 | 2/1966 | Munday et al. | 526/317.1 |
| 3,857,824 | 12/1974 | Atkins | 526/217 |
| 4,027,082 | 5/1977 | Gavrilova et al. | 526/217 |
| 4,375,533 | 3/1983 | Park et al. | 526/89 |

OTHER PUBLICATIONS

Condensed Chemical Dictionary (Seventh Edition), p. 45 (1966).

Primary Examiner—C. Warren Ivy
Assistant Examiner—Alex H. Walker
Attorney, Agent, or Firm—Bernard D. Bogdon; Craig E. Larson; Christopher E. Blank

[57] ABSTRACT

A process for preparing hydrophilic polymeric beads by suspension polymerization of one or more hydrophilic monomers and a cross-linking monomer in the presence of a free radical initiator and a regenerator amine at a temperature between 15° and 35° C. The beads are useful as abrasives in various cleaning compositions.

12 Claims, No Drawings

PROCESS FOR PREPARING POLYMERIC BEADS

This is a continuation of co-pending application Ser. No. 703,786 filed on Feb. 21, 1985, now abandoned.

BACKGROUND

1. Field of the Invention

This invention relates to a process for preparing polymeric beads

2. Description of the prior art

Cross-linked hydrophilic polymers and their use in contact lenses and other biomedical devices is well known For some applications it is preferable to use these polymers in a particulate form rather than as a cast or die cut article Particulate polymer can be obtained by grinding previously prepared polymers or by employing certain processing techniques during suspension polymerization The conventional suspension polymerization process can be controlled readily to produce globular particles 0.1 to 2 millimeters in diameter With the use of high-speed stirrers and emulsifiers, the size of the individual particles can be reduced to 20-100 microns When smaller particles are needed, coarser material is crushed or ground, and the comminuted material is classified according to size, hydraulic classification usually being necessary for fractions smaller than 100 microns.

U.S. Pat. No. 3,583,957, R. C. Chromecek et al, discloses that when monomers having one olefinic bond, e.g. ethylene glycol methacrylate, and two olefinic double bonds, e.g. ethylene glycol dimethacrylate, are copolymerized under quiescent conditions to obtain globular particles smaller than ten microns in diameter when at least 40 percent of the polymerization mixture is a solvent inert to the monomers and to the resulting copolymer The monomers are initially dissolved in the solvent whereas the copolymer is insoluble in the solvent and is not significantly swelled by the same. Under these conditions, a mass of loosely cohering globular copolymer particles of the desired size is formed. The mass is readily disintegrated into the individual particles by applied light pressure or by simply immersing the mass in an inert liquid This process, however, is not efficient for continuous or large volume production, requires high temperatures and because of the temperature employed tends to fuse the particles produced Hydrophilic polymers have been closely associated with the contact lens and biomedical device fields Typically an elevated temperature has been employed to prepare these polymers, see U.S. Pat. No. 3,532,679, R. Steckler, which discloses temperatures of 35°-60° C. U.S. Pat. No. 3,700,761 F. O'Driscoll et al, which discloses a first stage temperature of 40°-60° C. and 90°-120° C. for the second stage, and U.S Pat. No. 3,822,089, 0. Wichterle, which discloses temperatures of 60°-85° C.

SUMMARY OF THE INVENTION

In accordance with this invention there is provided a process for preparing hydrophilic polymeric beads comprising the solvent suspension polymerization of one or more hydrophilic monomers, an optional modulus modifier and a cross-linking agent in the presence of a free radical initiator and a free radical regenerator amine, the polymerization being carried out at a temperature between 15° and 35° C.

DESCRIPTION OF THE PREFERRED EMBODIMENTS

The polymers produced in accordance with this invention are hydrophilic and strong, yet soft. The term "soft" is used in the well established sense of the contact lens field to describe polymeric products which are either flexible or semiflexible when hydrated These polymers are shape retaining and do not smear out when subjected to shearing forces encountered in many cleaning applications.

The solvent polymerization of this invention avoids the peak heat exotherm problem of the prior art by employing a temperature from 15° to 35° C. and preferably from about 20° to 30° C. The suspending medium can be any inert liquid which is not a solvent for the resulting polymeric beads Suitable liquids include aromatic hydrocarbons, e.g. toluene, xylene, liquid alkanes, e.g., hexane, cyclohexane, ethers, e.g., petroleum ether, and the like. The suspending medium is present in the reaction mixture in an amount, by weight, from 3 to 5 times the weight of the monomeric reactants. Preferably the ratio of medium to monomer is about 4 to 1.

The hydrophilic monomer of this invention is a monohydroxyester, the free acid, amide or an amine of acrylic acid, methacrylic acid or itaconic acid, as well as the monofunctional derviatives of crotonic, itaconic, maleic and fumaric acids. Two or more of these monomers may be employed as comonomers in the polymers of this invention Additionally, one or more N-vinyl lactams can be employed as comonomers present in the polymeric composition.

Illustrative of suitable hydrophilic monomers are the mono-, di-, tri-, tetra- and poly-ethylene glycol monoacrylates or methacrylates or itaconates as well as the acids per se. Hydroxyalkyl methacrylates with 1 to 8 carbon atoms in the alkyl group are within the scope of this invention. Useful amides of the foregoing acids include acryl, methacryl, N-mono- or di-substituted diacetone acrylamide. Also useful are the amines of the foregoing acids such as mono- or di-alkylamino substituents. The preferred hydrophilic monomers are hydroxy methacrylates, particularly hydroxyethyl methacrylate (HEMA).

The nitrogen containing monomer used in the preparation of the copolymers of this invention is conveniently referred to as an N-vinyl lactam which includes (a) N-vinyl lactams per se and (b) other heterocyclic N-vinyl monomers. Illustrative of the N-vinyl lactams that are employed in this invention are N-vinyl-2-pyrrolidinone, N-(1-methyl vinyl) pyrrolidinone, N-vinyl-2-piperidone and N-vinyl-2-caprolactam which may be substituted in the lactam ring by one or more lower alkyl groups such as methyl, ethyl or propyl, e.g., N-vinyl-5-methyl pyrrolidinone, N-vinyl-3,3-dimethyl pyrrolidinone, N-vinyl-5-ethyl pyrrolidinone and N-vinyl-6-methyl piperidone. Illustrative of the other heterocyclic N-vinyl monomers used in preparing the copolymers of this invention are N-vinyl imidazole, N-vinyl succinimide, N-vinyl diglycolylimide, N-vinyl glutarimide, N-vinyl-3-morpholinone and N-vinyl-5-methyl-3-morpholinone. The lactam may be an admixture of two or more lactam monomers to give hydrogels having the particularly desired characteristics. The preferred lactam is ON-vinyl-2-pyrrolidinone.

The N-vinyl lactam monomer(s) are used in conjunction with one or more of the above defined hydrophilic comonomers. The N-vinyl lactam will constitute less than 50% of the copolymer.

The composition of the polymeric beads can be varied by the use of a modulus modifier monomer to achieve a particularly desired set of polymer properties. For the purpose of this invention the term modulus modifier includes the monomers which are well known in contact lens technology as hydrophobic monomers as well as modulus modifiers disclosed by U.S. Pat. No. 4,327,203, W. G. Deichert et al, U.S. Pat. No. 4,341,889, W. G. et al Deichert, and U.S. Pat. No. 4,355,147, W. G. Deichert et al. Modulus modifiers disclosed by the foregoing !;. G. Deichert et al patents include isobornyl acrylate, isobornyl methacrylate, dicyclopentadienyl acrylate, dicyclopentadienyl methacrylate, adamantyl acrylate, admantyl methacrylate, isopinocamphyl acrylate, isopinocamphyl methacrylate, menthyl methacrylate, menthyl acrylate, tertiary butyl cyclohexyl methacrylate, isopropylcyclopentyl acrylate, tertiary pentylcycloheptyl methacrylate, tertiary butyl cyclohexyl acrylate, isohexylcyclopontyl acrylate, methyl isopentylcyclooctyl acrylate, and tertiary butyl styrene. They may be added to the reaction mixture to improve the modulus property of the resulting polymer or copolymer. These modifiers, when employed, are generally present in an amount up to about 60 weight percent and preferably from 5 to 30 weight percent of the total monomers present.

The other subgroup of modulus modifiers are the so called hydrophobic monomers. These monomers are alkylesters of acrylic, methacrylic, crotonic, maleic, fumaric and itaconic acids. The alkyl group may be normal, branched or substituted in configuration. Preferably the alkyl group will contain from 1 to 8 carbon atoms. Particularly useful esters are methyl acrylate and methyl methacrylate The hydrophobic monomers may be present in an amount up to 20 weight percent of the total monomers present.

The polymers of this invention are cross-linked by all types of cross-linking compounds used in the prior art, see for instance U.S. Pat. Nos. 3,822,089, 0. Wichterle, 4,1522,508, E. J. Ellis et al, or 4,440,919, R. C. Chromecek et al. The cross-linking agent is preferably employed in an amount from 0.1 to 20.0 weight percent of the total monomers present. Examples of cross-linking agents include polyfunctional derivatives of the previously enumerated acids, e.g., acrylic acid, methacrylic acid, crotonic acid, itaconic acid, maleic acid, and fumaric acid, acrylamide, methacrylamide and multivinyl substituted benzenes. More particularly these cross-linking agents include, but are not limited to, ethylene glycol diacrylate or dimethacrylate, diethylene glycol diacrylate or dimethacrylate, tetraethylene glycol diacrylate or dimethacrylate, polyethylene glycol diacrylate or dimethacrylate, trimethylolpropane triacrylate or trimethacrylate, Bisphenol A diacrylate or dimethacrylate, ethoxylated Bisphenol A diacrylate or dimethacrylate, pentaerythritol tri- and tetraacrylate or methacrylate, tetramethylene diacrylate or dimethacrylate, methylene bis- acrylamide or methacrylamide, dimethylene bis- acrylamide or methacylamide, N,N'-dihydroxyethylene bis- acrylamide or methacrylamide, divinyl benzene, hexamethylene bis- acrylamide or methacrylamide, decamethylene bis- acrylamide or methacrylamide, vinyl methacrylate and allyl methacrylate. Yet another group are di- or polyvinyl ethers of di- or polyvalent alcohols such as ethylene glycol divinyl ether. Still another group of cross-linking agents are resonance free di(alkene tertiary amine) cyclic compounds. This last group includes cyclic dialkene urea, e.g.,cyclic divinyl urea, dialkene amides, dialkene hydrouracils, dialkene 2,2'-bisimidazolin, the alkene being either vinyl, alpha methyl vinyl, alpha methyl allyl or allyl. Representative compounds include divinyl ethylene urea, diallyl ethylene urea and 1,1'-diallyl-2,2'-bisimidazolin.

The polymerization is achieved by the use of a variety of free radical initiators which can be, among others, an azo compound, a peroxy dicarbonate, a peroxy ester, or a sulfonyl acid peroxide. Preferably the free radical initiator will have a 10 hour half life temperature of 75° C. or less, i.e. it is a low to medium temperature initiator. The initiator is employed in an amount from 1 to 2.5 percent by weight of the total monomer charge Illustrative of useful free radical initiators in the process of this invention are 2,2'-azobis(2,4-dimethyl-4-methoxy valeronitrile), benzoyl peroxide, 2,2'-azobis(2,4-dimethylvaleronitrile), 2,2'-azobis (isobutyronitrile), 2-t-butylazo-2-cyano-4-methoxy-4-methylpentane, acetyl peroxide, 2-t-butylazo-2-cyano-4-methylpentane, 2,4-dichlorobenzoyl peroxide, p-chlorobenzoyl peroxide, decanoyl peroxide, diisononanyl peroxide, lauroyl peroxide, propinoyl peroxide, bis(4-t-butyl cylcohexyl) peroxy dicarbonate, di(sec-butyl) peroxy dicarbonate, diisopropyl peroxy carbonate, di(n--propyl) peroxy carabonate, di(2-ethylhexyl) peroxy carbonate, di(2-phenoxyethyl) peroxy carbonate, t-amyl peroxy pivatate, t-amyl perpivataate, t-butyl peroxyacetate, t-butyl peroxyisobutyrate, t-butyl peroxypivatate, t-butyl peroxy neodecanonate, t-amyl perneodecanonate, cumyl perneodecanonate, cumyl perpivate, 2,5-dimethyl-2,5-bis(2-ethyl hexanoyl peroxy) hexane, t-butylperoxy-2-ethylhexanoate, t-amyl peroxy (2-ethylhexanoate) and acetyl cyclohexyl sulfonyl peroxide.

The low level of free radical initiator present in this invention reduces, if not virtually eliminates, the high peak exotherm normally associated with suspension polymerization. Thus, run away reactions with uncontrollable heat build-up are avoided. Additionally, process safety is increased by reduction of the fire and explosion potential. These improvements also result in poor yields. It has been found that amine free radical regenerators satisfactorily overcome this problem.

The amine free radical regenerators of this invention are preferably secondary or tertiary amines and more preferably a tertiary amine. These amines are generally of the formula $R_2NG$ or $R_3N$ wherein R is alkyl or substituted alkyl and G is hydrogen, benozate or substituted benzoate. For the purposes of this invention, the amine includes the salts thereof. Preferably the amine regenerator will be a tertiary amine. The amine is present in an amount of 0.1 to 5.0 weight percent of the monomer charged in this process. The desired amine(s) may be charged to the reaction at the beginning or in portions throughout the reaction period. It is useful to disperse the amine in the reaction medium prior to its addition to the reaction.

Illustrative of the amine free radical regenerators of this invention are methylbutyl amine, bis(2-hydroxyethyl)butyl amine, butyldimethyl amine, dimethyl amine, dibenzylethy amine, diethylmethyl amine, dimethylpentyl amine, diethyl amine, 2,2',2"-trihydroxy dipropyl ethyl amine, di-n-propylene amine, 2,2',2"-trimethyl tributyl amine, triethyl amine, triethyl amine hydrochloride, dimethyl aminoacetal, pentylhexyl amine, triethanolamine, triheptyl amine, trihexyl amine, trimethyl amine, trimethyl amine hydrochloride, trioctadecyl amine, tripropyl amine, trisopropyl amine, dodecyl trimethyl ammonium choride, tetramethylene diamine, and esters of paraamino benzoic acid, e.g., p-dimethyl amino-2-ethylhexylbenzoate, dimethyl aminoethyl acetate, 2-(n-butoxy)ethyl 4-dimethylaminobenzoate, 2-(dimethylamino) ethyl benzoate, ethyl 4-dimethylaminobenzoate, methyldiethanolamine, dibutyl amine, N,N-dimethylbenzylamine, methylethyl amine and dipentyl amine.

The reaction is carried out in the presence of an inert atmosphere. This condition may be achieved by the use of nitrogen, argon, carbon dioxide and the like.

The reaction is maintained for such times as is required to achieve the desired yield of polymer beads. This time may be as little as one half hour. However, to approach the theoretical yield 24 to 48 hours at room temperature is required.

The beads produced by this process range in size rom 0.1 to 10 microns in diameter and are substantially smaller particles than those produced by prior art processes. The beads may range from elliptical to spherical in shape. A typical diameter of the bead is about 5 microns.

The beads produced by this invention exhibit absorbent, adsorbent and abrasive properties which make them useful both as cleaning agents and as delivery systems The beads are exceptionally absorptive towards proteins and lipids. The beads have greater cleaning ability when employed as an abrasive in cleaners without the scratching, grinding, gouging etc., which is objectionable during cleaning of optical surfaces and other fine surfaces The nature of these beads permits them to adsorb surfactants and other cleaners so as to permit controlled application to the desired surface. The beads are useful in contact lens cleaners, facial scrubs, heavy-duty hand cleaner, automotive or household cleaners, vinyl or leather cleaners, tile and sanitary ware cleaners and the like.

The following examples are illustrative only and should not be construed as limiting the invention. All parts and percents referred to herein are on a weight basis Temperatures are expressed in degrees Celsius unless otherwise specified.

EXAMPLE I

Hydroxyethyl methacrylate copolymer beads are prepared by dissolving 266.6 g. 2-hydroxyethyl methacrylate, 66.6 g. methyl methacrylate and 66.6 g. ethylene glycol dimethacrylate in 930 ml of technical grade xylene. A solution composed of 8 g. dibenzoyl peroxide and 465 ml of xylene is added with stirring. Then a solution composed of 8 g. p-dimethylamino-2-ethylhexyl benzoate and 465 ml of xylene is added with stirring. The reaction mixture is purged with nitrogen and a nitrogen stream is maintained during the entire reaction time. The temperature remains at room temperature. After about one half to one hour polymeric beads begin to form. The reaction is continued for 48 hours. The polymeric powder is filtered, washed with methylene chloride and air dried. Yield is 324.6 g. which is 81.2% of theory. The beads are suitable for use in contact lens cleaners.

EXAMPLE II

Following the procedure of Example I but substituting N-vinyl pyrrolidinone for methyl methacrylate copolymeric beads are prepared. EXAMPLE III Example I is repeated wherein hexane is substituted for the xylene medium and the free radical generator is 2,2'-azobis(isobutyronitrile). The resulting beads are suitable for use in a facial scrub preparation.

EXAMPLE IV

Example I is repeated except menthyl methacrylate is substituted for the methyl methacrylate.

EXAMPLE V

Example I is repeated except that the solvent is cyclohexane and the total amount of solvent is 1,200 g. The ratio of solvent to reactants is 3:1.

EXAMPLE VI

Example V is repeated except that the initiator is 8 g. of 2,4-dichlorobenzoyl peroxide and the regenerator amine is 16g. of dimethylenthanol amine. The ratio of amine to initiator is 2:1. The beads are useful in a tile cleaner.

EXAMPLE VII

Using the reaction conditions of Example I copolymer beads are prepared by reacting 160 g. of N-vinyl pyrrolidinone, 20 g. cyclohexyl methacrylate and 20 g. of divinyl ethylene urea in a total of 1,000 g. of toluene. The initiator is 8 g. of 2,4-dichlorobenzoyl peroxide and the regenerator amine is 16 g. of dimethylethanol amine. The ratio of solvent to reactants is 5:1 and the ratio of amine to initiator is 2:1.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. The process for preparing hydrophilic polymeric beads by polymerization in an organic liquid medium of one or more hydrophilic monomers and at least one cross linking monomer in the presence of a free radical initiator and a regenerator amine, said amine being selected from the group consisting of secondary amines and tertiary amines wherein the monomers are initially dissolved in the liquid medium and wherein the the copolymer is insoluble in the liquid medium, the polymerization being maintained at a temperature from 15° to 35° C. for a period of one half to 48 hours whereby cross linked polymeric beads having an average diameter from 0.1 to 10 microns are precipitated from said solvent.

2. The process of claim 1 wherein the free radical initiator has a 10 hour half life temperature of 75° C. or less.

3. The process of claim 2 wherein the free radical initiator is present in an amount from 1 to 2.5 weight percent of the total monomer charge.

4. The process of claim 3, wherein the regenerator amine is present in an amount from 0.1 to 5.0 weight percent of the total monomer charge.

5. The process of claim 4 wherein the regenerator amine is a secondary amine.

6. The process of claim 4 wherein the regenerator amine is a tertiary amine.

7. The process of claim 6 wherein the solvent medium is present in an amount of 3 to 5 times the weight of the monomer charged.

8. The process of claim 7 wherein a modulus modifier monomer is added.

9. The process of claim 7 wherein one of the hydrophilic monomers present is an N-vinyl lactam.

10. The process of claim 7 wherein the reaction is carried out at a temperature from about 20° to 30° C.

11. The process of claim 7 wherein the solvent medium is selected from the group consisting of aromatic hydrocarbons, liquid alkanes and petroleum ethers.

12. The process of claim 11 wherein the solvent medium is an aromatic hydrocarbon.

* * * * *